US009596372B2

United States Patent
Shoda

(10) Patent No.: US 9,596,372 B2
(45) Date of Patent: Mar. 14, 2017

(54) IMAGE PROCESSING APPARATUS, IMAGE PROCESSING METHOD AND IMAGE FORMING APPARATUS

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventor: Hirokazu Shoda, Yokohama Kanagawa (JP)

(73) Assignees: KABUSHIKI KAISHA TOSHIBA, Tokyo (JP); TOSHIBA TEC KABUSHIKI KAISHA, Tokyo (JP)

(*) Notice: Subject to any disclaimer, the term of this patent is extended or adjusted under 35 U.S.C. 154(b) by 0 days.

(21) Appl. No.: 14/812,118

(22) Filed: Jul. 29, 2015

(65) Prior Publication Data
US 2017/0034379 A1 Feb. 2, 2017

(51) Int. Cl.
*H04N 1/04* (2006.01)
*H04N 1/00* (2006.01)
*H04N 1/028* (2006.01)

(52) U.S. Cl.
CPC ....... *H04N 1/00822* (2013.01); *H04N 1/0061* (2013.01); *H04N 1/00411* (2013.01); *H04N 1/00602* (2013.01); *H04N 1/02815* (2013.01); *H04N 2201/0094* (2013.01)

(58) Field of Classification Search
CPC .......... B60S 1/166; B41J 2/32; B41J 2202/37; B41M 7/0009; B41M 7/009; F04D 13/06; F04D 29/588; F16H 1/225; F16H 2057/127; F16H 55/24; G03G 15/607; G03G 2215/00177; G03G 2215/00185; G03G 2215/0028

USPC ....... 358/474, 518, 505, 520, 451, 461, 462, 358/500, 514, 515, 448, 482, 483, 501, 358/521, 449, 463, 465, 488, 498, 475, 358/504, 509, 1.13, 513; 382/167; 399/130, 38
See application file for complete search history.

(56) References Cited

U.S. PATENT DOCUMENTS

| 7,639,404 B2* | 12/2009 | Ikeno ................... H04N 1/1017 358/461 |
| 8,228,568 B2* | 7/2012 | Yoshimoto ......... H04N 1/02815 358/474 |
| 2007/0273935 A1* | 11/2007 | Ide ..................... H04N 1/00681 358/474 |
| 2007/0291326 A1* | 12/2007 | Morita ................. H04N 1/1013 358/474 |

(Continued)

FOREIGN PATENT DOCUMENTS

JP        2011-045052        3/2011

*Primary Examiner* — Negussie Worku
(74) *Attorney, Agent, or Firm* — Amin, Turocy & Watson LLP; Gregory Turocy

(57) ABSTRACT

An image processing apparatus comprises an input interface, a light source unit, a reading unit and a control unit. The input interface receives an input reading condition. The light source unit comprises a plurality of light sources which emit lights of different wavelengths. The reading unit reads an image on a sheet irradiated by the light of the light source unit. The control unit separately controls the quantity of the light emitted from each light source according to the reading condition input from the input interface.

14 Claims, 5 Drawing Sheets

(56) References Cited

U.S. PATENT DOCUMENTS

| | | | | |
|---|---|---|---|---|
| 2008/0273229 A1* | 11/2008 | Morisawa | ........ | H04N 1/00649 358/498 |
| 2008/0297857 A1* | 12/2008 | Ishikawa | ............ | H04N 1/00909 358/498 |
| 2009/0021798 A1* | 1/2009 | Abahri | ................... | H04N 1/195 358/474 |
| 2009/0185205 A1* | 7/2009 | Nakajima | .......... | H04N 1/40012 358/1.9 |
| 2009/0323095 A1* | 12/2009 | Tanimoto | ............. | H04N 1/3871 358/1.13 |
| 2011/0188095 A1* | 8/2011 | Shiraishi | ................. | H04N 1/04 358/474 |
| 2011/0194161 A1* | 8/2011 | Nakamura | ............... | H04N 1/56 358/505 |
| 2013/0044338 A1* | 2/2013 | Nikaku | ............. | H04N 1/00013 358/1.13 |
| 2013/0162934 A1* | 6/2013 | Hirayama | ............ | G09G 3/3611 349/69 |

* cited by examiner

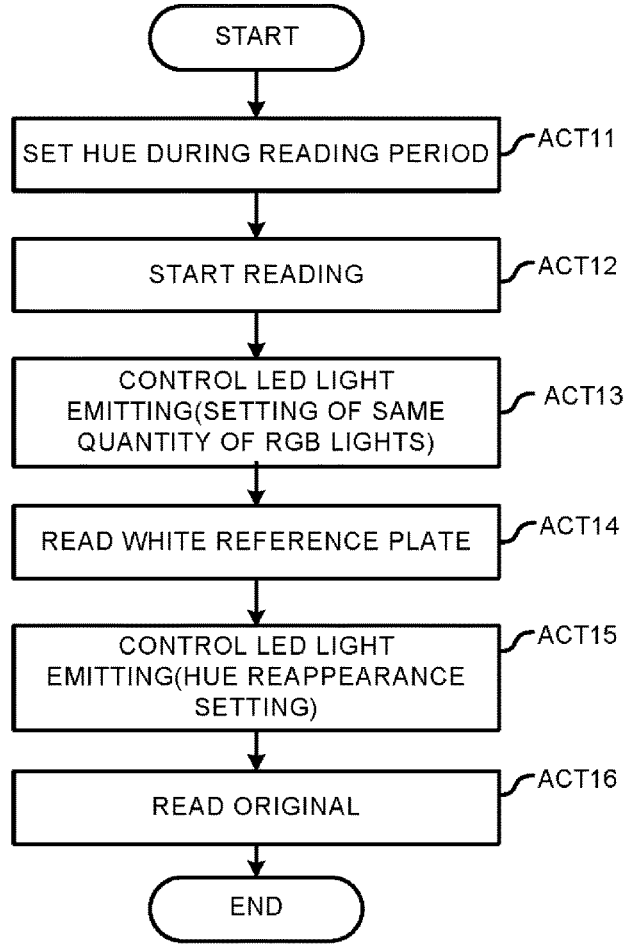
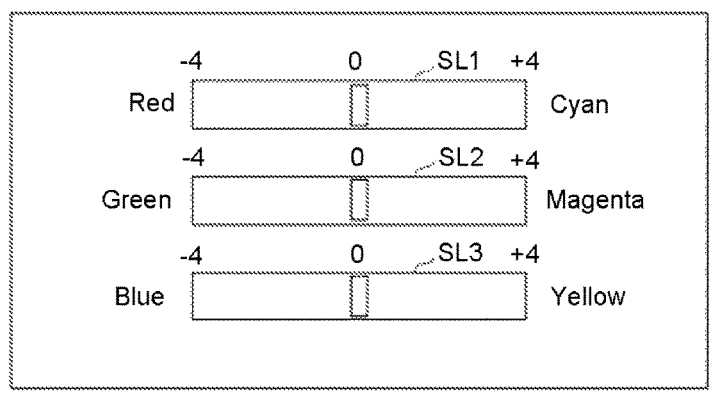

IMAGE PROCESSING APPARATUS, IMAGE PROCESSING METHOD AND IMAGE FORMING APPARATUS

FIELD

Embodiments described herein relate to an image processing apparatus, an image processing method and an image forming apparatus.

BACKGROUND

Scanner is known as one of the apparatuses for reading one or more sheets to generate digital data. In one kind of scanners, a plurality of light sources are arranged to emit lights of different wavelengths. This kind of scanner is equipped with a Light Emitting Diode (LED) light source for emitting red light, an LED light source for emitting green light and an LED light source for emitting blue light. Colors reappear when the scanner reads the color images on a sheet. Thus, the scanner controls each light source so as to irradiate the sheet with white light.

However, in recent years, a scanner is desired to be capable of changing the quality of an image according to the preference of the user. Thus, in this scanner, the chrominance of a light source needs to be controlled according to the preference of the user. As the mainstream of scanners is Auto Document Feeder (ADF) which is capable of reading both sides of a sheet, in this scanner, the hue of a light source can be changed for the surface and the back of a sheet.

The present invention is intended to provide an image processing apparatus, an image processing method and an image forming apparatus which are capable of reading an image corresponding to the preference of the user.

DESCRIPTION OF THE DRAWINGS

FIG. 4 is a flowchart exemplifying the actions of an image processing apparatus according to an embodiment;

FIG. 5 is a diagram exemplifying a hue setting screen in an image processing apparatus according to an embodiment;

DETAILED DESCRIPTION

In accordance with an embodiment, an image processing apparatus comprises an input interface, a light source unit, a reading unit and a control unit. The input interface receives an input reading condition. The light source unit comprises a plurality of light sources which emit lights of different wavelengths. The reading unit reads an image on a sheet illuminated by the light emitted from the light source unit. The control unit separately controls the quantity of the light emitted from each of the light sources according to the reading condition input from the input interface.

The image processing apparatus, the image processing method and the image forming apparatus of the present invention are described below with reference to accompanying drawings.

Figure 1:
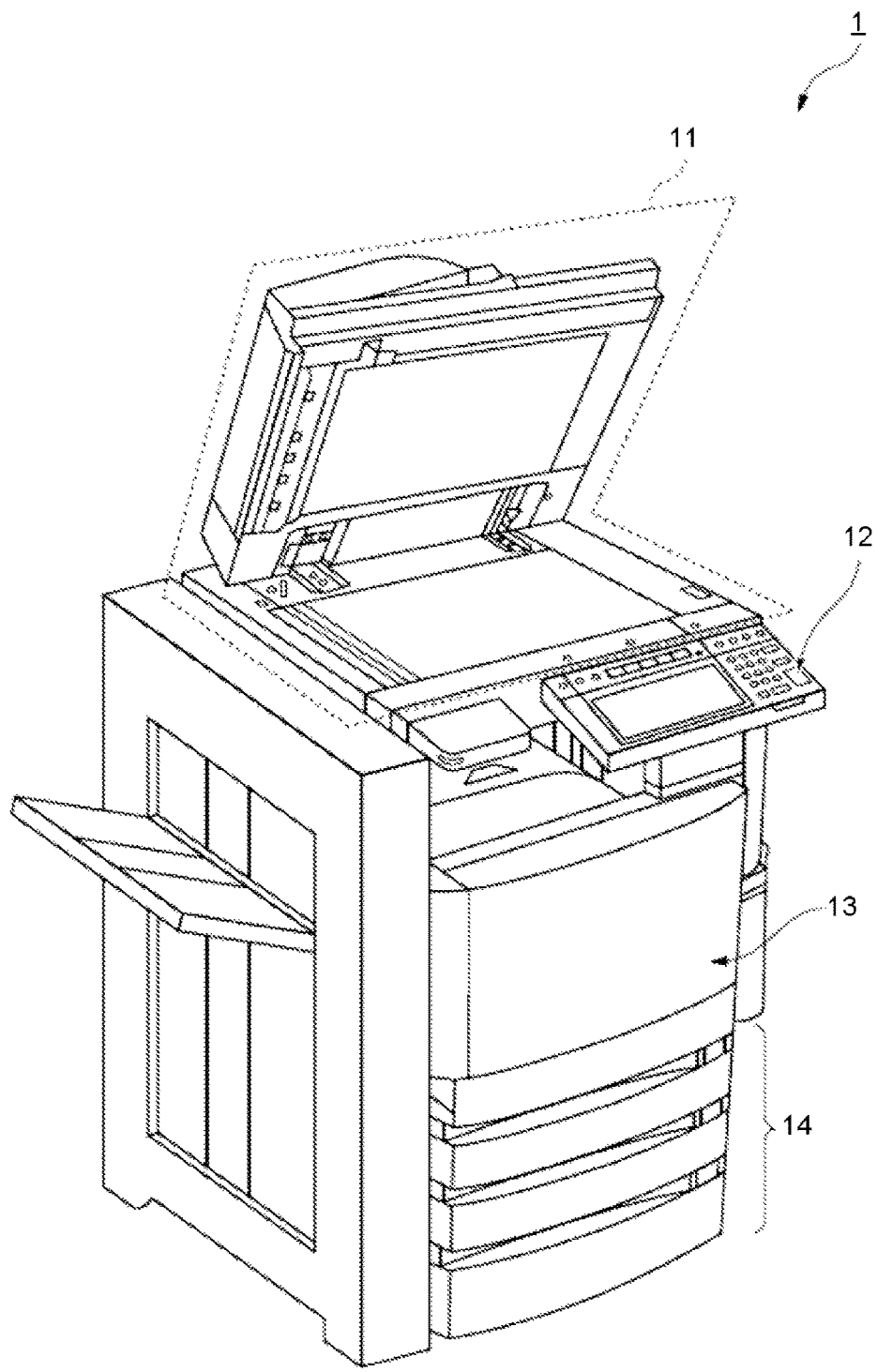
FIG. 1 is a diagram illustrating the appearance of an image forming apparatus according to an embodiment.

FIG. 1 is a diagram illustrating the appearance of an image forming apparatus 1 according to an embodiment. An image forming apparatus 1 is, for example, a Multi-Function Peripheral (MFP). The image forming apparatus 1 reads, for example, one or more sheets to generate digital data. The image forming apparatus 1 forms an image with the generated digital data. The sheet is, for example, paper on which an original, words or images is/are recorded, and any other object that can be read by the image forming apparatus 1. The sheet is hereinafter referred to as 'original'.

The image forming apparatus 1 comprises an image reading apparatus 11 (an image processing apparatus), a control panel unit 12 (an input interface), a printer unit 13 (an image forming unit) and a paper tray 14. The image reading apparatus 11 reads the image on an original G. The image reading apparatus 11 outputs data (hereinafter referred to as 'read image data') representing the read image (hereinafter referred to as 'read image') to the printer unit 13.

The control panel unit 12 functions as a user interface for receiving an operation input by the user. The control panel unit 12 is equipped with, for example, a touch screen on which an operation section and a display section are integrated. The operation section of the control panel unit 12 receives various instructions given to the image forming apparatus 1 according to the operation of the user. The display section of the control panel unit 12 displays various kinds of information for the user. The information displayed is, for example, information representing the action status of the image forming apparatus 1. The control panel unit 12 may be equipped with operating buttons in addition to the touch screen. The touch screen of the control panel unit 12 may be replaced by independent operation section and display section.

The printer unit 13 comprises a printer engine, an image processing substrate and a printer engine control substrate. The printer unit 13 inputs the read image data output from the image reading apparatus 11. The image processing substrate of the printer unit 13 carries out an image processing for the read image data. The printer engine control substrate of the printer unit 13 forms, on a sheet, an image corresponding to the read image data subjected to the image processing. The printer unit 13 is further capable of printing, on a sheet, an image input from an external device via a network. The printer unit 13 may also be an inkjet image forming apparatus, but not limited to an image forming apparatus for fixing a toner image. The paper tray 14 is a tray capable of accommodating the sheet used by the printer unit 13.

Figure 2:
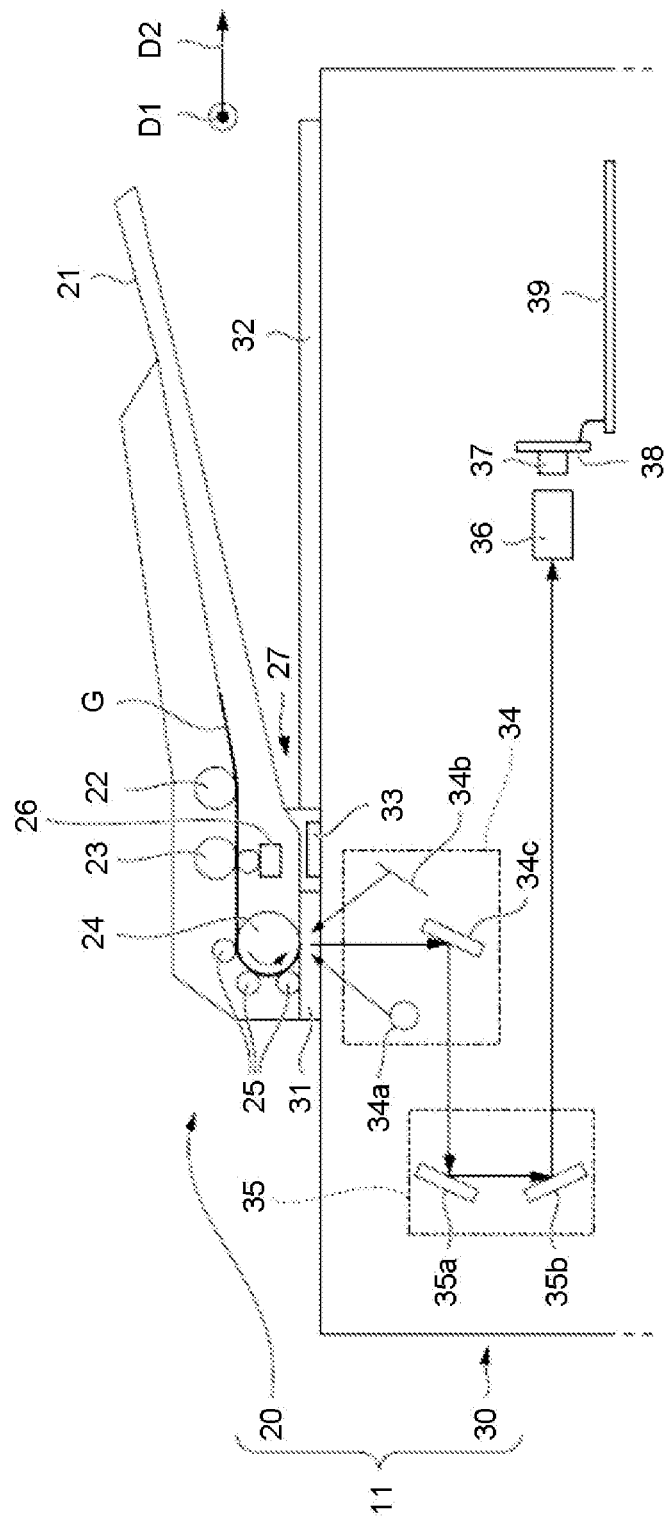
FIG. 2 is a sectional view schematically illustrating the main structure of an image processing apparatus according to an embodiment.

Next, the image reading apparatus 11 serving as an image processing apparatus of an embodiment is described with reference to FIG. 2. FIG. 2 is a sectional view schematically illustrating the main structure of an image processing apparatus according to an embodiment. The image reading apparatus 11 comprises a paper feeder 20 and an original reader 30.

The paper feeder 20 comprises an original feeding unit 21, a pickup roller 22, a resist roller 23, a belt transfer drum 24, a conveyance roller 25, a back reading module 26 (a light source unit, a reading unit, a second light source unit and a second reading unit) and an original discharging unit 27. The paper feeder 20 automatically feeds the originals G held on the original feeding unit 21 to an original image reading position one by one. The paper feeder 20 is capable of reading the image on the back of the automatically fed original G.

The original feeding unit 21 is a unit for accommodating the original G conveyed by the paper feeder 20. A plurality of originals G can be held on the original feeding unit 21. The pickup roller 22 is a drive roller for outputting the originals G on the original feeding unit 21 to the resist roller 23 one by one. The resist roller 23 is a drive roller for outputting the original G fed from the pickup roller 22 to the belt transfer drum 24 at a given time.

The belt transfer drum 24 is a drum which conveys the original G fed from the resist roller 23 towards a secondary scanning direction D2 by winding up the original G thereon and then rotating. The original G is wound on nearly half of the belt transfer drum 24. The conveyance roller 25 is a roller which conveys the original G fed from the resist roller 23 together with the belt transfer drum 24. A plurality of the conveyance rollers 25 are configured around the circumferential direction of the belt transfer drum 24.

The back reading module 26 which is configured on the back side of the original G conveyed by the belt transfer drum 24 towards the secondary scanning direction D2 reads an image on the back of the original G. The back reading module 26 is provided with a light source unit including a plurality of light sources for emitting lights of different wavelengths. For example, the light source unit includes a red LED light source (a first LED light source), a green LED light source (a second LED light source) and a blue LED light source (a third LED light source). The red LED light source emits red light. The green LED light source emits green light. The blue LED light source emits blue light. The back reading module 26 is equipped with a reading unit for reading an image on the back of an original G. For example, the back reading module 26 is provided with a Charge Coupled Device (CCD) linear sensor in which a CCD element is arranged in a primary scanning direction D1. The original discharging unit 27 is a unit for discharging the original G conveyed by the belt transfer drum 24 towards the secondary scanning direction D2.

The original reader 30 comprises an ADF glass 31, an original stage glass 32, a white reference plate 33, a first carriage 34, a second carriage 35, a condensing lens 36, a CCD linear sensor 37 (a reading unit and a first reading unit), a CCD sensor substrate 38 and a control substrate 39. The original reader 30 reads the image on the surface of the original G automatically fed by the paper feeder 20. The original reader 30 reads the image on the side of an original G facing the original stage glass 32, wherein the original G is placed on the original stage glass 32 by the user.

The ADF glass 31 is a transparent plate glass arranged on the original reader 30. The ADF glass 31 is located under the belt transfer drum 24 of the paper feeder 20. The originals G sequentially conveyed by the belt transfer drum 24 towards the secondary scanning direction D2 successively pass the ADF glass 31. The position where the ADF glass 31 is configured is the position where the original G conveyed by the paper feeder 20 is read. The original stage glass 32 is a transparent plate glass arranged on the original reader 30. The original stage glass 32 is located on the right side shown in FIG. 2 when compared with the ADF glass 31. The original G to be read without using the paper feeder 20 is placed on the original stage glass 32 by the user.

The white reference plate 33 is a white plate providing a reference color for shading correction. The white reference plate 33 is arranged on the original reader 30 and located between the ADF glass 31 and the original stage glass 32. The white reference plate 33 is a plate-shaped component having long sides and short sides. The long sides of the white reference plate 33 are located along the primary scanning direction D1. That is, the short sides of the white reference plate 33 are located along the secondary scanning direction D2.

The first carriage 34 comprises a light source unit 34a (a light source unit, a first light source unit), a reflector 34b and a first mirror 34c. The first carriage 34 is movably mounted on a track extending along the secondary scanning direction D2. When the original G automatically fed by the paper feeder 20 is read, the first carriage 34 is fixed under the ADF glass 31, as shown in FIG. 2. When the original G placed on the original stage glass 32 is read, the first carriage 34 moves below the original stage glass 32 towards the secondary scanning direction D2.

The first carriage 34 emits light towards the upside. The first carriage 34 reflects the light entering from above to the second carriage 35. For example, the first carriage 34 emits light towards the ADF glass 31. The first carriage 34 reflects the light reflected by the original G passing the ADF glass 31 to the second carriage 35. Alternatively, the first carriage 34 emits light towards the original stage glass 32 and reflects the light reflected by the original G on the original stage glass 32 to the second carriage 35.

The light source unit 34a faces the surface of the original G conveyed towards the secondary scanning direction D2. The light source unit 34a emits light upward obliquely. The light source unit 34a has a plurality of light sources which emit lights of different wavelengths. For example, the light source unit 34a includes a red LED light source (a first LED light source) for emitting red light, a green LED light source (a second LED light source) for emitting green light and a blue LED light source (a third LED light source) for emitting blue light. The reflector 34b reflects the light emitted from the light source unit 34a to the reflector 34b upward obliquely. The first mirror 34c reflects the light entering from above to the second carriage 35. For example, the first mirror 34c reflects the light reflected by the original G on the ADF glass 31 towards the second carriage 35. Alternatively, the first mirror 34c reflects the light reflected by the original G on the original stage glass 32 towards the second carriage 35.

The second carriage 35 comprises a second mirror 35a and a third mirror 35b. The second carriage 35 is movably mounted on the same track with the first carriage 34 and located on the left side of the first carriage 34 shown in FIG. 2. When the original G automatically fed by the paper feeder 20 is read, the second carriage 35 is fixed at the position shown in FIG. 2. When the original G placed on the original stage glass 32 is read, the second carriage 35 moves towards the secondary scanning direction D2 matching with the movement of the first carriage 34. The second carriage 35 reflects the light coming from the first carriage 34 to the condensing lens 36. That is, the second mirror 35a reflects the light coming from the first carriage 34 down, and the third mirror 35b reflects the light reflected by the second mirror 35a towards the condensing lens 36.

The condensing lens 36 condenses the light reflected by the third mirror 36b to form the imaging on the illuminated surface of the CCD linear sensor 37. Like the CCD linear sensor of the back reading module 26, the CCD linear sensor 37 is a linear sensor in which a CCD element is arranged in the primary scanning direction D1. The CCD sensor substrate 38 is a substrate on which a circuit for activating the COD linear sensor 37 to function is formed. The control substrate 39 is a substrate for a circuit which comprehensively controls the actions of the image reading apparatus 11 to form a read image.

Figure 3:
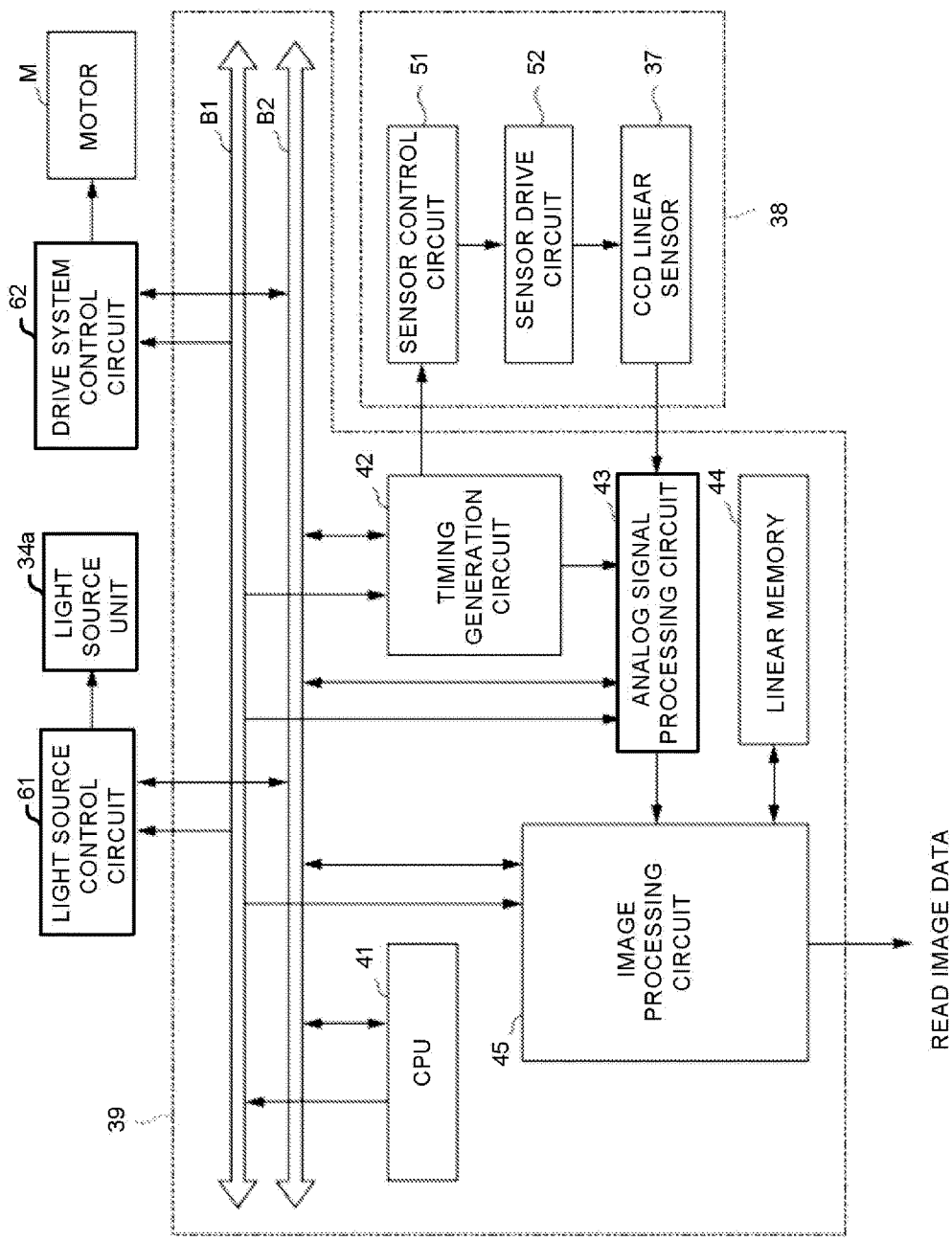
FIG. 3 is a block diagram schematically illustrating the main structure of the control system of an image processing apparatus according to an embodiment.

Next, the control system of the image reading apparatus 11 serving as an image processing apparatus of an embodiment is described with reference to FIG. 3. FIG. 3 is a block diagram schematically illustrating the main structure of the control system of an image processing apparatus according to an embodiment. In FIG. 3, a control circuit for controlling the back reading module 26 is not shown. The motor M shown in FIG. 3 represents a motor for driving a drive system arranged in the image reading apparatus 11. The drive system comprises a pickup roller 22, a resist roller 23, a belt transfer drum 24, a conveyance roller 25, a first carriage 34 and a second carriage 35.

The control substrate 39 comprises a CPU 41 (a control unit), a timing generation circuit 42, an analog signal processing circuit 43, a linear memory 44 and an image processing circuit 45. The control substrate 39 has an address bus B1 and a data bus B2. In the control substrate 39, the CPU 41, the timing generation circuit 42, the analog signal processing circuit 43 and the processing circuit 45 are connected with the address bus B1 and the data bus B2.

The CPU 41 comprehensively controls the actions of the image reading apparatus 11. For example, the CPU 41 controls the light source control circuit 61 to control the illumination of the light source unit 34a. The CPU 41 also controls the illumination of the back reading module 26. The CPU 41 controls the timing generation circuit 42 to control the reading action of the CCD linear sensor 37. The CPU 41 controls the analog signal processing circuit 43 and the image processing circuit 45 to control an image processing performed on a signal obtained by the CCD linear sensor 37. The CPU 41 further controls the reading action of the back reading module 26 and an image processing performed on a signal obtained by the back reading module 26. The CPU 41 controls a drive system control circuit 62 to control the actions of the paper feeder 20, the first carriage 34 and the second carriage 35.

The CPU 41 separately controls the quantity of the light emitted from each light source of the light source unit 34a according to a reading condition input into the control panel unit 12. That is, the CPU 41 separately controls the quantity of the light emitted from each of the red LED light source, the green LED light source and the blue LED light source of the light source unit 34a. The CPU 41 separately controls the quantity of the light emitted from each light source of the back reading module 26 according to a reading condition input into the control panel unit 12. That is, the CPU 41 separately controls the quantity of the light emitted from each of the red LED light source, the green LED light source and the blue LED light source of the back reading module 26. The CPU 41 separately controls the quantity of the light emitted from each light source of the light source unit 34a and that of the light emitted from each light source of the back reading module 26.

When the white reference plate 33 is read, the CPU 41 controls the light sources so that the quantity of the light emitted from each of the light sources is equal. For example, when the CCD linear sensor 37 reads the white reference plate 33, the CPU 41 carries out a control of equalizing the quantities of the lights emitted from the light sources of the light source unit 34a. When the back reading module 26 reads the white reference plate 33, the CPU 41 carries out a control of equalizing the quantities of the lights emitted from the light sources of the back reading module 26.

The CPU 41 carries out the control when reading the white reference plate 33 so as to read the white reference plate in a hue preferred by the user. Generally, shading correction is a processing of correcting the unevenness in light quantities of light sources. Thus, a user-preferred hue is corrected when the white reference plate 33 is irradiated by light having the user-preferred hue and a shading correction is carried out. To avoid this situation, the CPU 41 controls the light sources so that the quantity of the light emitted from each of the light sources is equal.

Under the control of the CPU 41, the timing generation circuit 42 generates various timing signals for use by the image reading apparatus 11. For example, the timing generation circuit 42 generates signals for driving the CCD linear sensor 37 and the CCD linear sensor of the back reading module 26. The signals for driving the CCD linear sensors are shifting gate signals (SH signals) and transmit clocks. The timing generation circuit 42 generates a signal for activating the analog signal processing circuit 43.

The analog signal processing circuit 43 processes the signals (analog signals) obtained from the CCD linear sensor 37 and the CCD linear sensor of the back reading module 26. The linear memory 44 is a memory for the data corresponding to a thread read by the =linear sensor 37 and the =linear sensor of the back reading module 26. The linear memory 44 corrects the offset in the reading position of the CCD linear sensor.

Under the control of the CPU 41, the image processing circuit 45 processes the data read by the CCD linear sensor 37 and the CCD linear sensor of the back reading module 26. For example, the image processing circuit 45 corrects the offset in the reading position of the CCD linear sensor with the linear memory 44. The image processing circuit 45 carries out a shading correction processing, an LOG conversion processing and other processing.

In addition to the CCD linear sensor 37, the CCD sensor substrate 38 further comprises a sensor control circuit 51 and a sensor drive circuit 52. The sensor control circuit 51 controls the actions of the CCD linear sensor 37 using the various timing signals output by the timing generation circuit 42 of the control substrate 39. For example, the sensor control circuit 51 adjusts the reading timing of the CCD linear sensor 37 using a timing signal output by the timing generation circuit 42. Under the control of the sensor control circuit 51, the sensor drive circuit 52 drives the CCD linear sensor 37. The sensor control circuit 51 may also be arranged in the timing generation circuit 42.

Under the control of the CPU 41, the light source control circuit 61 causes the light source unit 34a to emit light or stop emitting light. Under the control of the CPU 41, the light source control circuit 61 controls the quantity of the light emitted from each of the red LED light source, the green LED light source and the blue LED light source of the light source unit 34a. For example, the light source control circuit 61 separately controls the currents supplied to the red LED light source, the green LED light source and the blue LED light source of the light source unit 34a and controls the quantity of the light emitted from each of the light sources. The light source control circuit 61 separately controls the illumination time and the light quantity of each of the red LED light source, the green LED light source and the blue LED light source of the light source unit 34a through a pulse width control. Under the control of the CPU 41, the drive system control circuit 62 controls the motor M for driving the paper feeder 20, the first carriage 34 and the second carriage 35.

Next, the actions of the image reading apparatus 11 serving as an image processing apparatus of an embodiment are exemplified with reference to FIG. 4. FIG. 4 is a flowchart exemplifying the actions of an image processing apparatus according to an embodiment. The processing shown in the flowchart of FIG. 4 is started with the setting of a reading condition by the user for the image reading apparatus 11 through an operation on the control panel unit 12.

When the processing is started, a hue setting screen is displayed on the control panel unit 12 for the setting of a hue corresponding to the operation of the user (Act 11). The hue setting screen is a screen for the user to set a hue when an original G is read by the image reading apparatus 11. FIG. 5 is a diagram exemplifying a hue setting screen in an image processing apparatus according to an embodiment. The hue setting screen exemplified in FIG. 5 has three sliders SL1-SL3.

The sliders SL1-SL3 set three primary colors of light at one end thereof and complementary colors of the three primary colors at the other end thereof. Specifically, the slider SL1 sets red, one of the three primary colors of light, at one end thereof and the complementary color for red color, that is, cyan, at the other end thereof; the slider SL2 sets green, one of the three primary colors of light, at one end thereof and the complementary color for green, that is, magenta, at the other end thereof; and the slider SL3 sets blue, one of the three primary colors of light, at one end thereof and the complementary color for blue, that is, yellow, at the other end thereof.

If the user slides the slider SL1 to the left side (the side of red) shown in FIG. 5, then the hue becomes strong in red. Contrarily, if the user slides the slider SL1 to the right side (the side of cyan) shown in FIG. 5, then the hue becomes strong in cyan. If the user slides the slider SL2 to the left side (the side of green) shown in FIG. 5, then the hue becomes strong in green. Contrarily, if the user slides the slider SL2 to the right side (the side of magenta) shown in FIG. 5, then the hue becomes strong in magenta. If the user slides the slider SL3 to the left side (the side of blue) shown in FIG. 5, then the hue becomes strong in blue. Contrarily, if the user slides the slider SL3 to the right side (the side of yellow) shown in FIG. 5, then the hue becomes strong in yellow.

In the case where only one side of an original G is read, only one hue setting screen exemplified in FIG. 5 is displayed on control panel unit 12. For example, when only the surface of an original G is read, a hue setting screen for the surface of the original G is displayed on the control panel unit 12. In the case where both sides of an original G are read, the hue setting screens exemplified in FIG. 5 are displayed on two control panel units 12. Specifically, a hue setting screen for the surface of the original G and a hue setting screen for the back of the original G are displayed on the control panel unit 12. The user can separately set the hues of the surface and the back of the original G based on the two hue setting screens displayed on the control panel unit 12.

Here, it is assumed that the user slides the slider SL1 to the left side (the side of red) shown in FIG. 5 on the hue setting screen for the back of an original G and carries out no operation on the hue setting screen for the surface of an original G. The content set on the hue setting screen is output from the control panel unit 12 to the CPU 41 when the user operates a start button after operating the hue setting screen. Moreover, the image reading apparatus 11 starts to read the original G (Act 12).

When the reading of the original G is started, first, each light source of the light source unit 34a and each light source of the back reading module 26 are controlled to emit lights in the same quantity (Act 13). Specifically, the CPU 41 separately outputs control signals to the light source control circuit 61 and the back reading module 26. Moreover, the red LED light source, the green LED light source and the blue LED light source of the light source unit 34a are controlled so as to be equalized in light quantity by the light source control circuit 61. Moreover, the red LED light source, the green LED light source and the blue LED light source of the back reading module 26 are controlled so as to be equalized in light quantity by the back reading module 26.

Figure 6A:
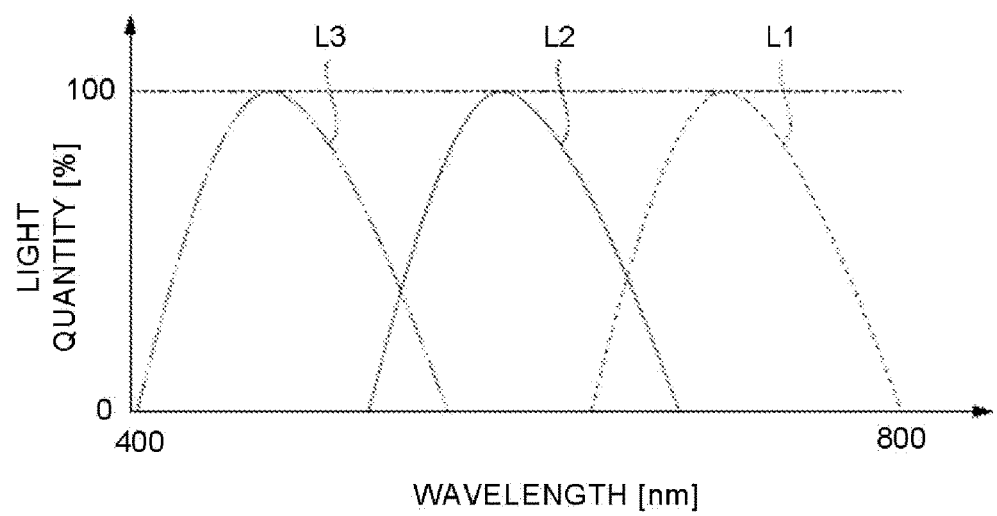
FIG. 6A is a diagram exemplifying the light quantity control in an image processing apparatus according to an embodiment.

FIG. 6A is a diagram exemplifying the light quantity control in an image processing apparatus according to an embodiment. In FIG. 6A, the curve L1 is a curve representing the wavelength characteristic of the light emitted from a red LED light source. The curve L2 is a curve representing the wavelength characteristic of the light emitted from a green LED light source. The curve L3 is a curve representing the wavelength characteristic of the light emitted from a blue LED light source. Subsequent to the start of the reading of the original G, the red LED light source, the green LED light source and the blue LED light source are controlled so that the light quantity in each central wavelength is equal.

Next, a processing of reading the white reference plate 33 is executed (Act 14). Specifically, the CPU 41 controls the motor M to move the first carriage 34 to be below the white reference plate 33, thereby irradiating the back of the white reference plate 33 with the lights that are emitted from the light source unit 34a and controlled to be equal in quantity. Moreover, the CCD linear sensor 37 reads the back of the white reference plate 33. The surface of the white reference plate 33 is irradiated by the lights that are emitted from the back reading module 26 and controlled to be equal in quantity. Moreover, the back reading module 26 reads the surface of the white reference plate 33.

After the data read by the CCD linear sensor 37 from the white reference plate 33 is processed by the analog signal processing circuit 43, the data is input to the image processing circuit 45 for shading correction. After the data read by the back reading module 26 from the white reference plate 33 is processed by the analog signal processing circuit 43, the data is input to the image processing circuit 45 for shading correction.

Sequentially, each light source of the light source unit 34a and each light source of the back reading module 26 are controlled according to the content set on the hue setting screen of the control panel unit 12 (Act 15). As it is assumed here that the user carries out no operation on the hue setting screen for the surface of an original G, the red LED light source, the green LED light source and the blue LED light source of the light source unit 34a are controlled so as to be equalized in light quantity by the light source control circuit 61. Specifically, the red LED light source, the green LED light source and the blue LED light source are controlled so that the light quantity in each central wavelength is equal, as shown in FIG. 6A.

Figure 6B:
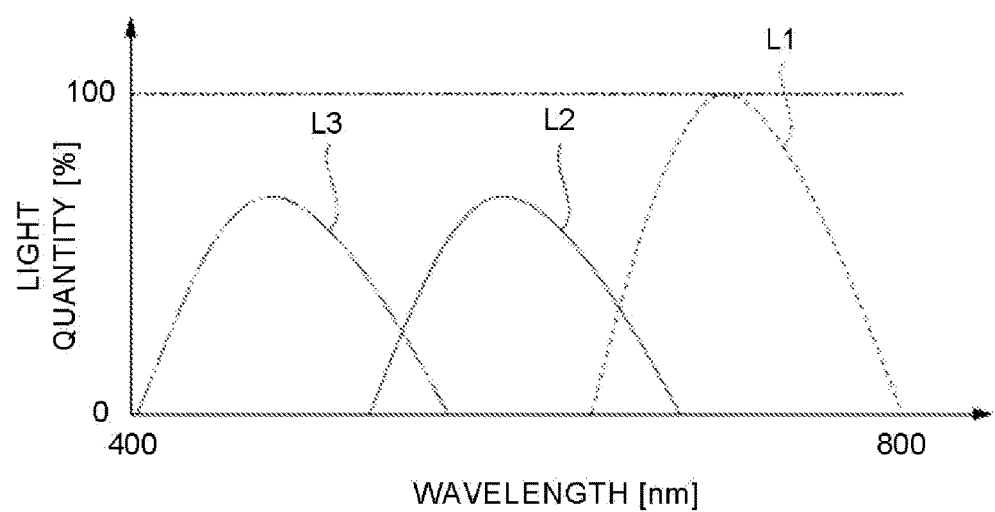
FIG. 6B is a diagram exemplifying another light quantity control in an image processing apparatus according to an embodiment.

Here, it is considered that the user slides the slider SL1 to the left side (the side of red) shown in FIG. 5 on the hue setting screen for the back of an original G. Thus, the red LED light source, the green LED light source and the blue LED light source of the back reading module 26 are controlled so that the light quantity of the red LED light source is relatively larger. FIG. 6B is a diagram exemplifying another light quantity control in an image processing apparatus according to an embodiment. In FIG. 6B, curves L1, L2 and L3 are curves representing the wavelength characteristics of the lights emitted from a red LED light source, a green LED light source and a blue LED light source.

In the example shown in FIG. 6B, a first control is carried out to reduce the light quantities of the green LED light source and the blue LED light source. Through the first control, the light quantity of the red LED light source is relatively larger than those of the green LED light source and the blue LED light source. A second control contrary to the first control may be carried out to increase the light quantity of the red LED light source. Through the second control, the light quantity of the red LED light source is also relatively larger than those of the green LED light source and the blue LED light source. Another control of increasing the light quantity of the red LED light source while decreasing those of the green LED light source and the blue LED light source is also applicable.

Then, a processing of reading the original G is carried out (Act 16). First, the CPU 41 controls the motor M to move the first carriage 34 to be below the ADF glass 31. Sequentially, the CPU 41 controls the motor M to rotate the pickup roller 22, the resist roller 23, the belt transfer drum 24 and the conveyance roller 25. In this way, the originals G held on the original feeding unit 21 are picked up one by one. The original G fed from the pickup roller 22 is output to the belt transfer drum 24 by the resist roller 23 at a given time.

The original G output to the belt transfer drum 24 is conveyed on the ADF glass 31 towards the secondary scanning direction D2 while being wound on the rotating belt transfer drum 24. Then, the light reflected from the surface of the original G passing the ADF glass 31 is read by the linear sensor 37. Meanwhile, the light reflected from the back of the original G conveyed in the secondary scanning direction D2 is read by the back reading module 26. The image processing circuit 45 performs an image processing on the data read by the linear sensor 37 and the data read by the back reading module 26. The data subjected to the image processing is output to the printer unit 13 as read image data. Moreover, an image corresponding to the read image data is formed on a sheet by the printer unit 13.

As stated above, the image processing apparatus of the embodiment acquires a reading condition input from an input interface. The image processing apparatus separately controls the quantities of the lights emitted from a plurality of light sources emitting lights of different wavelengths according to the reading condition. The image processing apparatus reads an image from a sheet illuminated by the lights emitted from the light sources which are separately controlled in light quantity. As a result, the image can be read in a user-preferred hue.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. An image processing apparatus, comprising:
    a processor that executes instructions to perform operations comprising:
        receiving a hue setting;
        emitting light of different wavelengths using a light source unit equipped with a plurality of light sources;
        reading an image on a sheet irradiated by light emitted from the light source unit; and
        separately controlling a quantity of the light emitted from each of the light sources based on the hue setting.

2. The image processing apparatus according to claim 1, further comprising:
    a white reference plate for shading correction, wherein the operations further comprise:
        controlling each of the light sources so that the quantity of the light emitted from each of the light sources is equal when the white reference plate is read.

3. The image processing apparatus according to claim 1, wherein
    the light source unit comprises a first light source section located on a first side of a surface of a sheet and a second light source section located on a second side of a back of the sheet; and wherein the operations further comprise:
        reading an image on the surface of the sheet illuminated by light emitted from the first light source section, and reading an image on the back of the sheet illuminated by light emitted from the second light source section.

4. The image processing apparatus according to claim 3, wherein the operations further comprise:
    separately controlling a quantity of light emitted from each light source comprising the first light source section and a quantity of light emitted from each light source comprising the second light source section.

5. The image processing apparatus according to claim 3, wherein
    the first light source section and the second light source section both include a first LED light source for emitting red light, a second LED light source for emitting green light and a third LED light source for emitting blue light.

6. The image processing apparatus according to claim 5, wherein the operations further comprise:
    separately controlling current supplied to the first LED light source, the second LED light source, and the third LED light source and the quantity of the light emitted from each of the first LED light source, the second LED light source, and the third LED light source.

7. The image processing apparatus according to claim 5, wherein the operations further comprise:
    separately controlling an illumination time and a light quantity emitted by each of the first LED light source, the second LED light source, and the third LED light source through a pulse width control.

8. An image forming apparatus, comprising:
    the image processing apparatus according to claim 1; and wherein the operations further comprise:
        forming an image according to image data of a sheet read by a reading unit of the image processing apparatus.

9. The image processing apparatus according to claim 1, wherein the operations further comprise:
    displaying a hue setting screen on a control panel unit of a input interface.

10. The image processing apparatus according to claim 9, wherein the operations further comprise:
    displaying at least a slider as the hue setting screen on the input interface.

11. The image processing apparatus according to claim 10, wherein the operations further comprise:
    displaying at least one of three primary colors near a first end of the slider and at least one of complementary colors near a second end of the slider, the second end being opposite the first end.

12. The image processing apparatus according to claim 9, wherein the operations further comprise:
displaying only one hue setting screen on the input interface in a case of reading only one side, and
displaying two hue setting screens on the input interface in a case of reading both sides.

13. An image processing method, comprising:
acquiring, by a system comprising a processor, a hue setting input from an input interface;
separately controlling, by the system, a quantity of light emitted from each of a plurality of light sources emitting light of different wavelengths based on the hue setting; and
acquiring, by the system, an image on a sheet irradiated by light emitted from the plurality of light sources.

14. The image processing method according to claim 13, wherein
each of the plurality of light sources is controlled, by the system, to emit light in a same quantity before the image on the sheet is read, not rigidly adhering to the hue setting; and
a white reference plate is read and used for shading correction.

* * * * *